United States Patent [19]
Suzuki

[11] Patent Number: 5,643,612
[45] Date of Patent: Jul. 1, 1997

[54] PARTIAL PAD MOLD

[75] Inventor: Hiroshi Suzuki, Anjyo, Japan

[73] Assignee: Kabushiki Kaisha Inoac Corporation, Aichi, Japan

[21] Appl. No.: 461,206

[22] Filed: Jun. 5, 1995

Related U.S. Application Data

[62] Division of Ser. No. 302,540, Sep. 8, 1994, Pat. No. 5,500,168.

[30] Foreign Application Priority Data

Jun. 7, 1994 [JP] Japan ................. 6-150405

[51] Int. Cl.$^6$ .................................................. B29C 44/12
[52] U.S. Cl. .................... 425/125; 425/162; 425/817 R
[58] Field of Search ........................... 425/125, 4 R, 425/817 R, 123, 162; 249/91; 264/278

[56] References Cited

U.S. PATENT DOCUMENTS

| | | | |
|---|---|---|---|
| 3,363,040 | 1/1968 | Aoki | 425/125 |
| 3,368,245 | 2/1968 | Witkowski | 425/817 R |
| 4,420,447 | 12/1983 | Nakashima | 425/817 R |
| 4,470,786 | 9/1984 | Sano et al. | 425/125 |
| 5,044,919 | 9/1991 | Hama et al. | 425/817 R |
| 5,208,043 | 5/1993 | Gatarz et al. | 425/125 |
| 5,500,169 | 3/1996 | Kondo et al. | 425/817 R |

FOREIGN PATENT DOCUMENTS

| | | | |
|---|---|---|---|
| 58-57927 | 4/1983 | Japan | 264/46.5 |
| 61-85728 | 5/1986 | Japan | 425/125 |
| 63-175435 | 7/1988 | Japan | 425/123 |
| 6-71659 | 3/1994 | Japan | 425/4 R |

*Primary Examiner*—Robert Davis
*Attorney, Agent, or Firm*—Koda and Androlia

[57] ABSTRACT

There is provided an improved process for partially molding a pad onto an instrument panel by partially covering the surface of a panel main body with a surfacing material, and filling a urethane foam under foaming in the space defined between the panel main body and the surfacing material and a mold used for such purpose. In the process of the invention, a mold consisting of an upper die having a core and a lower die having a cavity wall is used, and possible outward falling down of the edge portion formed along the periphery of the surfacing material is designed to be prevented by supporting members which are arranged retractably in the cavity wall of the lower die at the positions along the line where the edge portion of the surfacing material lies. The supporting members retain the edge portion until the upper die is fully closed with respect to the lower die.

1 Claim, 9 Drawing Sheets

PARTIAL PAD MOLD

This is a division of application Ser. No. 08/302,540, filed Sep. 8, 1994, U.S. Pat. No. 5,500,168.

BACKGROUND OF THE INVENTION

This invention relates to a process for partially molding a pad on the surface of an automotive instrument panel and to a mold which can suitably be used for practicing the process.

Figure 13:
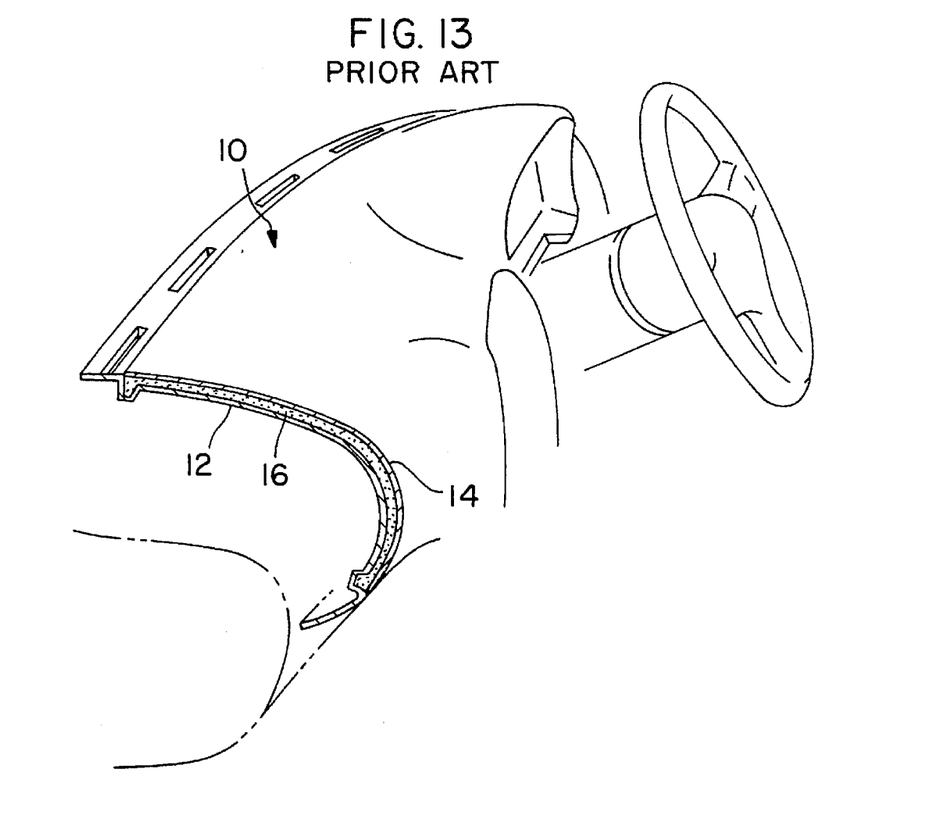
FIG. 13 shows an explanatory view of the instrument panel which is used as an automotive interior equipment.

Multilayered molded products, each consisting of an insert material, a surfacing material and a urethane foam sandwiched therebetween, are suitably employed for automotive interior equipment such as an instrument panel in order to achieve lightening, improvement of decorability and damping of the impact at collision. For example, the instrument panel 10 shown in FIG. 13 consists of a panel main body 12 serving as the base, a surfacing material 14 which is exposed on the interior side of a vehicle and a urethane foam 16 filled by foaming in the space defined between the panel main body 12 and the surfacing material 14, and the entire panel is allowed to function as a pad with the aid of the foam filler. As the panel main body 12, for example, rigid resins which can easily be subjected to compression molding or injection molding, such as thermoplastic resins including polyethylene, polypropylene, nylon, and acrylonitrile-styrene, incorporated with a glass filler can suitably be employed. Meanwhile, as the surfacing material 14, a thermoplastic resin sheet, a thermoplastic elastomer film, etc. can be employed.

Figure 11:
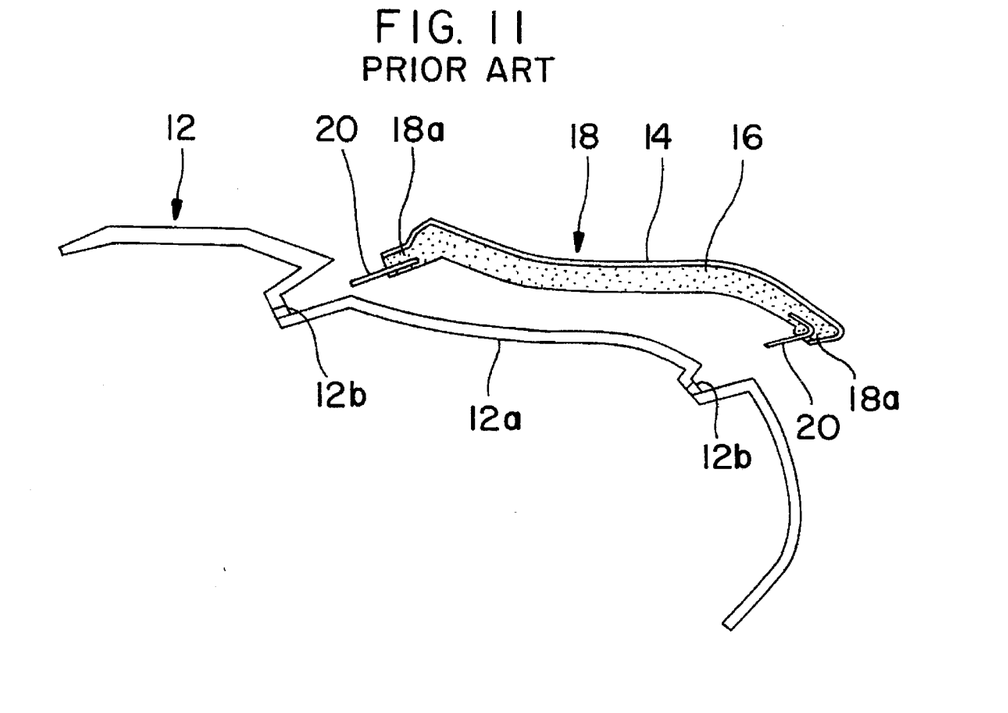
FIG. 11 shows a cross section for explaining the prior art where the pad formed beforehand is being fitted onto the panel main body.
Figure 12:
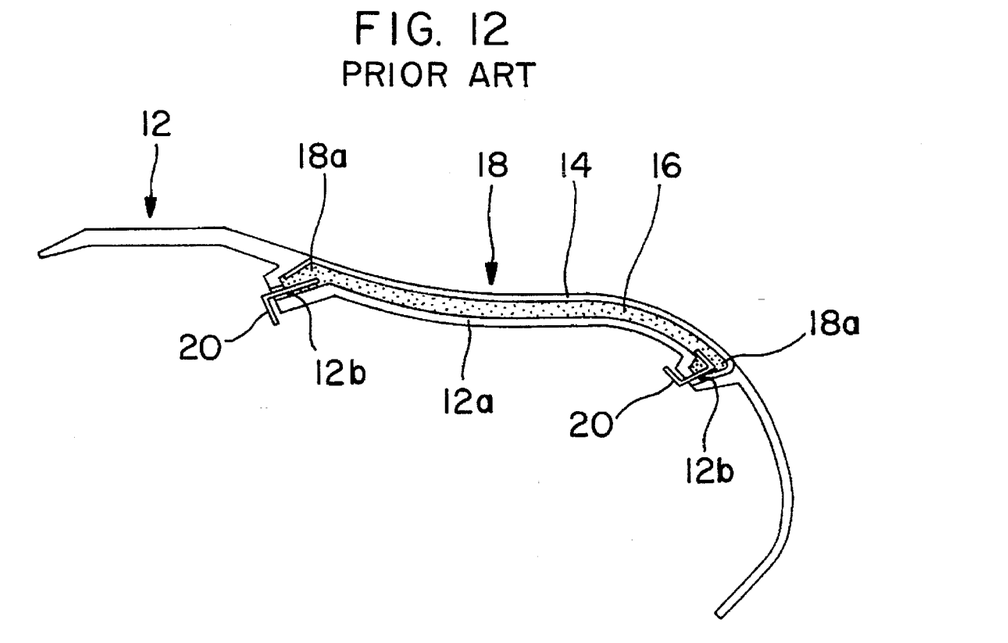
FIG. 12 shows a cross section for explaining the prior art where the pad formed beforehand is fully fitted onto the panel main body.

As such instrument panel 10, there are (1) those entirely covered with the surfacing material 14 and (2) those partially provided with the pad at the necessary portions of the panel main body 12 as seen in relatively inexpensive cars. Namely, in the latter example, a pad consisting of the surfacing material 14 and urethane foamed onto the rear surface of the surfacing material 14 is designed to be applied to the necessary portions of the panel main body 12, and the main purpose is to meet the requirement of reducing the production cost. As a technique for partially applying the pad on the surface of the panel main body, it is conventionally practiced, as shown in FIGS. 11 and 12, to form beforehand a pad 18, consisting of a surfacing material 14 and a urethane foam 16, to be applied partially onto the panel main body 12, and then the pad 18 thus formed beforehand is fitted onto the necessary portions of the panel main body 12. The pad 18 has protrusions 18a to be inserted to the panel main body 12, and a bendable tongue 20 is embedded in each protrusion 18a and extended partly outward. The panel main body 12 has a setback 12a and grooves 12b. The setback 12a has a depth such that the surface of the pad 18 fitted on the panel main body 12 may coincide with the surface of the panel main body 12, whereas the grooves 12b allow insertion of the projections 18a of the pad 18 therein. As shown in FIG. 12, the pad 18 can partially be applied onto the panel main body 12 with the pad surface coinciding with the panel surface, by fitting the pad 18 in the setback 12a of the panel main body 12 and inserting the protrusions 18a in the corresponding grooves 12b. By bending the tongues 20 inserted to the through holes defined in the grooves 12b after the pad 18 formed beforehand is thus fitted onto the panel main body 12, the pad 18 is prevented from slipping off the panel main body 12.

The conventional method of partially fitting the pad 18 formed beforehand onto the panel main body 12 involves the following problems which must be solved. First of all, while the pad 18 is formed by foaming urethane onto the rear surface of the surfacing material 14 using a mold independent of the panel main body 12, the yield of the surfacing material 14 in the molding is extremely low, disadvantageously. Further, since the tongues 20 for preventing slipping off of the pad 18 from the panel main body 12 must be embedded in the pad 18, the cost of the parts and the number of step are increased, disadvantageously. In addition, not only a step of cutting the superfluous portions of the surfacing material 14 in the pad 18, but also another step of fitting the pad 18 onto the panel main body 12 become necessary. Moreover, it can be pointed out that, since the pad 18 formed beforehand is to be fitted onto the panel main body 12, nonuniformity occurs in the accuracy of fitting the pad 18 depending on the skill of the worker.

Figure 10A:
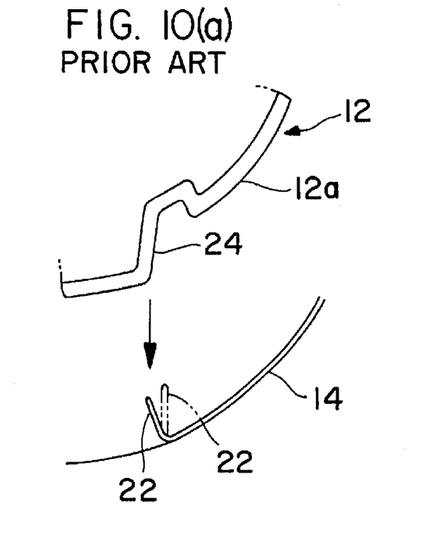
FIG. 10(a) and 10(b) shows in explanatory view the process that the edge portion standing from the periphery of the surfacing material toward the rear surface thereof is caused to fall outward when it is brought into contact with the panel main body in the course of die closing.
Figure 10B:
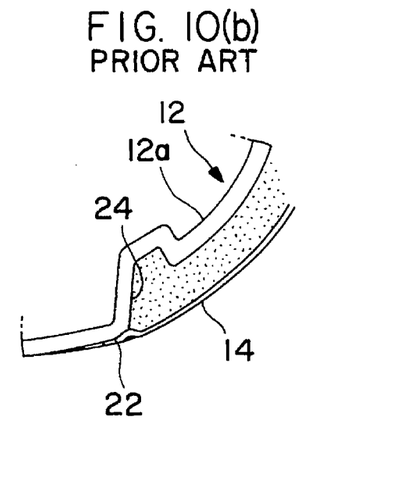

With a view to overcoming these problems, the inventors of the present invention previously proposed a process for partially molding a pad onto an instrument panel, as detailed below. The process comprises (1) molding preliminarily a surfacing material having a predetermined pad profile and also an edge portion, along the periphery thereof to stand toward the rear surface thereof; (2) separately molding preliminarily a panel main body having a predetermined shape and also a recess, formed on the front surface of the main body, which receives the edge portion; (3) setting the surfacing material and the panel main body on the cavity wall of a lower die and on the core of an upper die, respectively; and (4) filling the space defined between the panel main body and the surfacing material with urethane under foaming, followed by mold releasing. However, when such pad molding process is actually practiced, the following drawbacks can occasionally be pointed out. Namely, as shown in FIGS. 10(a) and 10(b), the edge portion 22 standing from the periphery of the surfacing material 14 toward the rear surface thereof sometimes fails to smoothly slip in the groove 24 defined in the panel main body 12 and falls outward, when the upper die is closed with respect to the lower die. In other words, since the surfacing material 14 itself has no rigidity, the panel main body 12 when descended together with the upper mold is brought into contact with the edge portion 22 to push and uncorrectably fell it outward as shown in FIG. 10(b). The thus obtained instrument panel is defective and cannot be used. Therefore, a means for preventing the edge portion from falling outward becomes necessary.

The process for partially molding a pad according to one aspect of the invention is proposed with a view to overcoming the problems inherent in the process described above, and it is an objective of the invention to provide a means which requires no molding of the pad, consisting of a surfacing material and urethane independent of the panel main body but can achieve partial molding of the pad onto the panel main body through one step to improve yield of the surfacing material, and which can omit the steps of cutting the surfacing material and the tongues for preventing slipping off of the pad, so as to eliminate the steps of incorporating the pad into the panel main body, giving excellent working accuracy. Meanwhile, in a pad molding mold according to another aspect of the invention, there is provided a means which can effectively prevent the edge portion standing from the periphery of the surfacing material toward the rear surface thereof from falling outward.

SUMMARY OF THE INVENTION

In order to overcome the problems described above and to attain the intended objects successfully, this invention is directed to provide a process for partially molding a pad onto an instrument panel by partially covering the surface of a panel main body with a surfacing material, and filling a urethane foam under foaming in the space defined between the panel main body and the surfacing material; characterized in that the surfacing material, molded into a predetermined shape and preliminarily provided with an edge portion standing from the periphery toward the rear surface thereof, is set in such a way that the front surface of the surfacing material may be abutted against the cavity wall of a lower die; the panel main body, molded into a predetermined shape and has a recess, which allows intrusion of the edge portion of the surfacing material, on the front surface thereof, is set in such a way that the rear surface thereof may be abutted against the core of an upper die; and a urethane stock solution is foamed in the space defined between the surfacing material and the panel main body to mold an instrument panel having a urethane foam as a core material.

In order to overcome the problems described above and attain the intended objects successfully, this invention is also directed to provide a mold for partially molding a pad by setting a panel main body and a surfacing material on the core of an upper die and on the cavity wall of a lower die, respectively, and allowing a urethane stock solution to be foamed in the space defined between the panel main body and the surfacing material to mold an instrument panel provided with a pad having a urethane foam as a core material; characterized in that the core of the upper die has a groove having a U-shaped cross section in which the recess provided on the front surface of the panel main body can intimately be received; the cavity wall of the lower die is provided with descendable supporting members arranged, when the upper die is closed, at the positions slightly outer than the groove formed on the core; and the supporting members are designed to retain the edge portion standing from the periphery of the surfacing material toward the rear surface thereof, when the surfacing material is set on the cavity wall, and to descend as the upper die is closed.

BRIEF DESCRIPTION OF THE DRAWINGS

The features of this invention that are believed to be novel are set forth with particularity in the appended claims. The invention, together with the objects and advantages thereof, may best be understood by reference to the following description of the preferred embodiments taken in conjunction with the accompanying drawings in which:

DETAILED DESCRIPTION OF THE INVENTION

The process for partially molding a pad and the mold used therefor, according to this invention, will now be described referring to the attached drawings. It should be noted here that the members described already referring to the drawings are affixed with the same numbers in the following description. First, the process for partially molding a pad on an instrument panel, in which the surface of the panel main body is partially covered with a pad with a urethane foam being filled in the space defined between the surfacing material and the panel main body, will be described.

Figure 1:
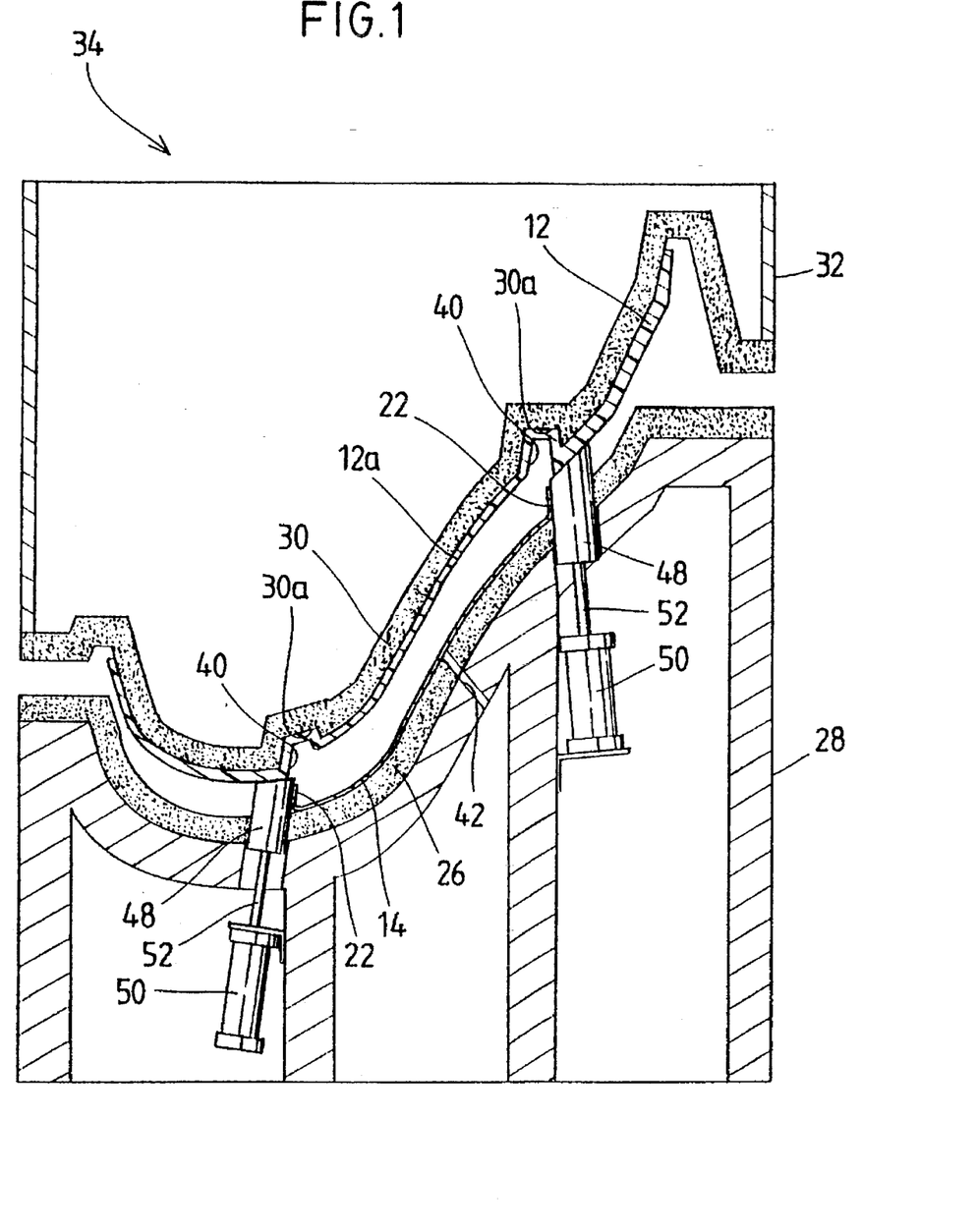
FIG. 1 shows in vertical cross section a mold for molding a pad according to a preferred embodiment of the invention, assuming the state where the upper die is about to be closed with respect to the lower die.
Figure 3:
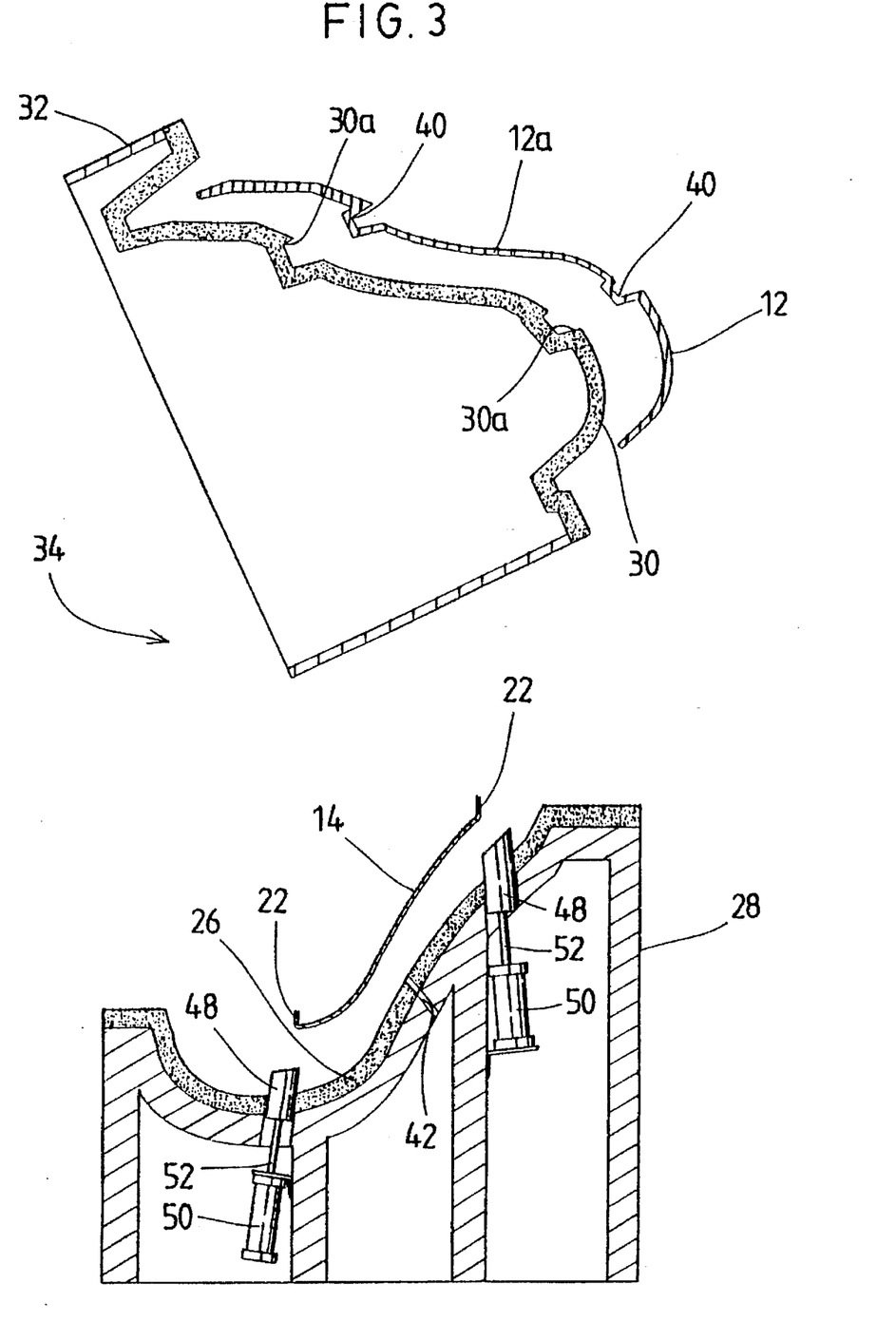
FIG. 3 shows in schematic explanatory view the state where the upper die of the mold is let open to set a panel main body on the core of the upper die, and a surfacing material on the cavity wall of the lower die, respectively.
Figure 6:
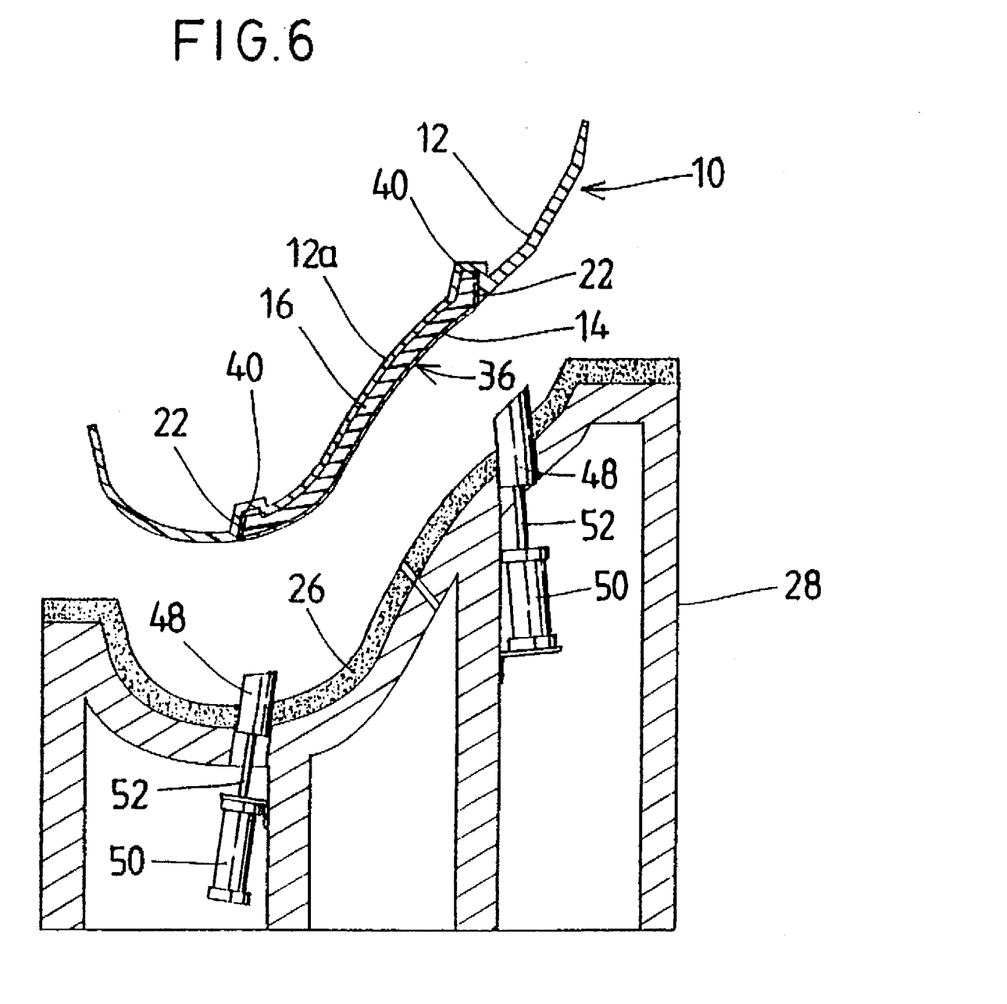
FIG. 6 shows in schematic explanatory view the state where the upper die is let open after foaming of urethane in the mold shown in FIG. 3 and an instrument panel is being released as a final product from the mold.

In order to carry out this partial molding process, as shown in FIGS. 3 and 1, a closing mold 34 consisting of a lower die 28 having a cavity wall 26 on which a surfacing material 14 (to be described later) is to be set and an upper die 32 having a core 30 on which a panel main body 12 (to be described later) is to be set is used. As shown in FIG. 6, predetermined profiles are imparted to the surfacing material 14 and the panel main body 12, respectively, in the individual steps so as to achieve partial molding of a pad 36 onto an instrument panel 10. More specifically, the surfacing material 14 serves as the external surface of the pad 36 to be applied partially on the surface of the automotive instrument panel and is molded preliminarily into a shape required of the pad 36 by means of vacuum molding or slush molding. Meanwhile, the edge portion 22 is formed integrally with the surfacing material 14 to stand from the periphery toward the rear surface thereof. The edge portion 22 is directed to slip into the recess 40 (to be described later) provided on the panel main body 12 to achieve intimate contact of the joint of the instrument panel with the pad after completion of molding, as well as, to make the joint not to stand out. Incidentally, the slush molding is a method in which a powdery material such as a vinyl chloride resin and a polyurethane resin or a paste sol is charged in a slush mold such as an electroformed mold, and the mold is heated to effect gelation of the portion of the powder or sol contacting with the mold, followed by discharging of the ungelled material, to provide a surfacing material 14 having a predetermined thickness.

Figure 7:
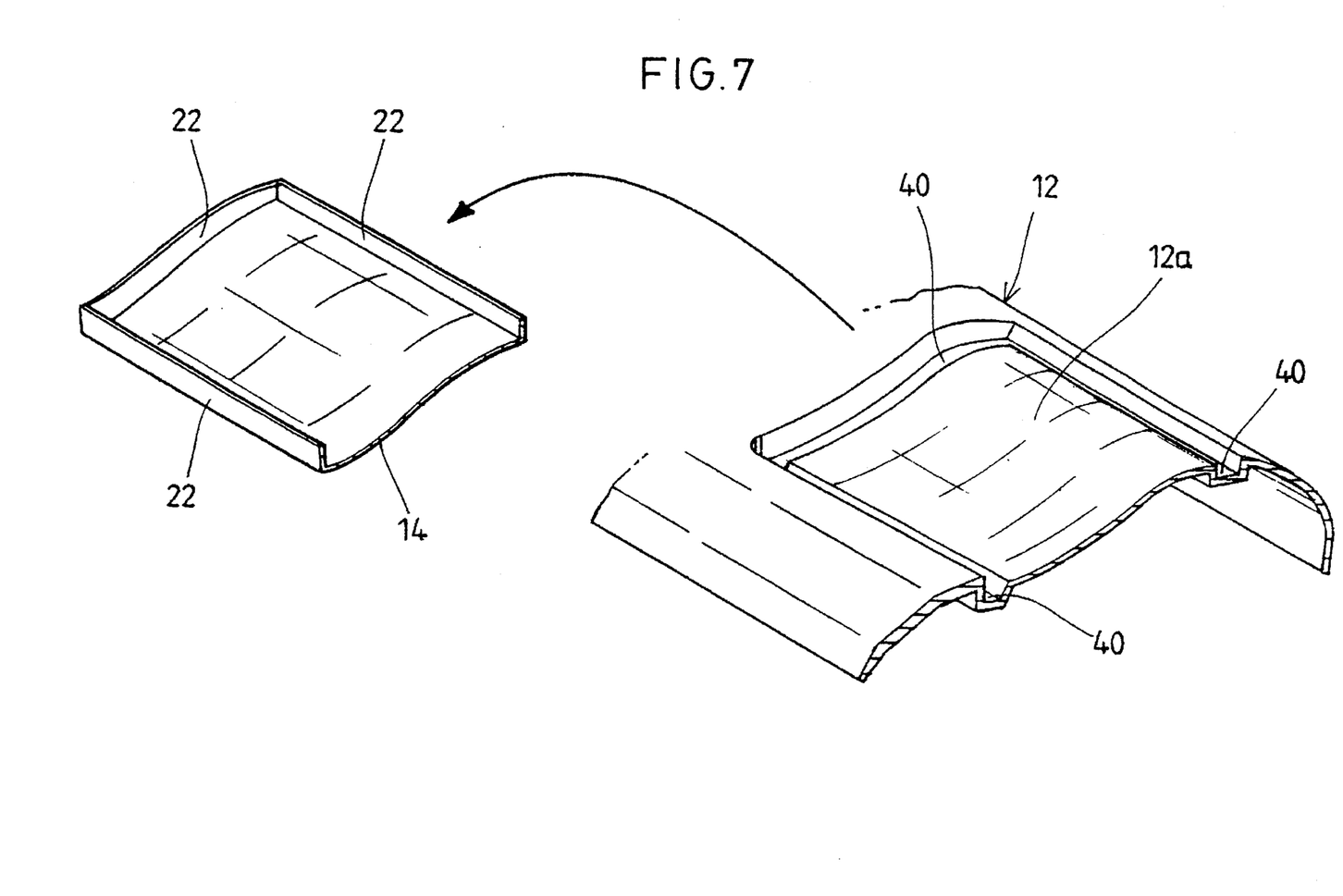
FIG. 7 shows schematically in perspective view the constitution of the panel main body and the surfacing material.

Meanwhile, the panel main body 12, which serves as the substrate of the instrument panel of a specific vehicle, is compression-molded or injection-molded into a shape required of the instrument panel. In this case, a setback 12a having a predetermined depth is formed on the panel main body 12, as shown in FIG. 7, and a urethane foam 16 (to be described later) constituting the core material of the pad 36 is to be filled in this setback 12a. A recess 40 into which the edge portion 22 standing from the periphery of the surfacing material 14 can slip is preliminarily formed on the front surface of the panel main body 12. The core 30 of the upper die 32 has a male die profile to which the panel main body 12 can completely be abutted, with a groove 30a having a U-shaped cross section and also having the same profile as that of the recess 40 of the panel main body 12 being defined at a predetermined portion, as shown in FIG. 3. This groove 30a functions to receive intimately therein the rear surface protrusion formed by defining the recess 40 on the panel main body 12.

As described above, after the panel main body 12 and the surfacing material 14 are preliminarily molded in separate steps, these two members are set on the corresponding dies of a closing mold 34. Namely, as shown in FIG. 3, the panel main body 12 is set in such a way that the rear surface thereof may be abutted against the core 30 of the upper die 32, wherein the rear surface protrusion corresponding to the recess 40 formed on the panel main body 12 is intimately received in the groove 30a defined in the core 30. Meanwhile, the surfacing material 14 is set in the lower die 28 such that the front surface may be abutted against the cavity wall 26. It should be noted here that the surfacing material 14 can strongly be brought into intimate contact with the cavity wall 26 by defining a vacuum suction hole 42 through the cavity wall 26 and connecting it to a vacuum suction source 44 shown in FIG. 2. In carrying out foaming of the urethane foam 16 between the panel main body 12 and the surfacing material 14 to fill the space defined therebetween, the upper die 32 is let open, and a urethane stock solution is shot onto the exposed surface of the surfacing material 14 from an injector (not shown). The urethane stock solution used here consists of a mixture obtained by stirring a solution A containing polyether polyol as the major component, with a foaming agent, a catalyst, a crosslinking agent, etc. being added thereto with a solution B comprising polyisocyanate. Meanwhile, since the cavity wall 26 on which the surfacing material 14 is set is sloped, the thus shot urethane stock solution speedily flows down along the exposed surface thereof and spreads out widely. The upper die 32 is then closed with respect to the lower die 28 and left as such for the cream time required for the reaction mixture to be saturated, and the reaction goes on to allow the urethane stock solution to undergo foaming and creep up the slope of the surfacing material 14, filling the space defined between the panel main body 12 and the surfacing material 14 with the urethane foam 16. Subsequently, the upper die 32 is let open, and the instrument panel 10 after completion of foaming is released from the mold. Thus, the pad 36 can partially be formed on the panel main body 12 of the instrument panel 10, as shown in FIG. 6. While the process described above resorts to the so-called open molding method, the closed molding method where the urethane stock solution is shot into the closed mold may be employed.

Figure 2:
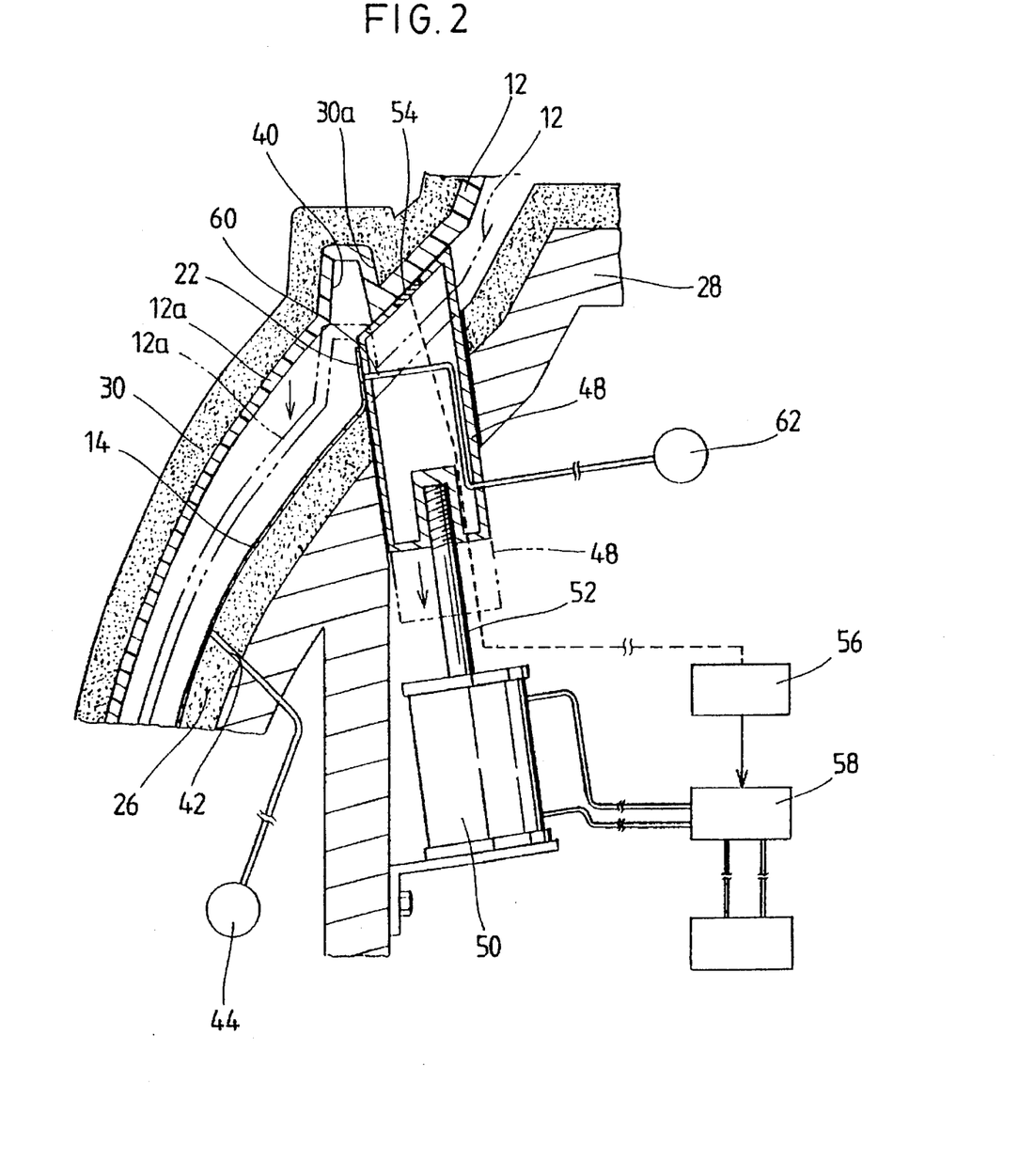
FIG. 2 shows in enlarged vertical cross section the major portion of the mold for molding a pad shown in FIG. 1.
Figure 8:
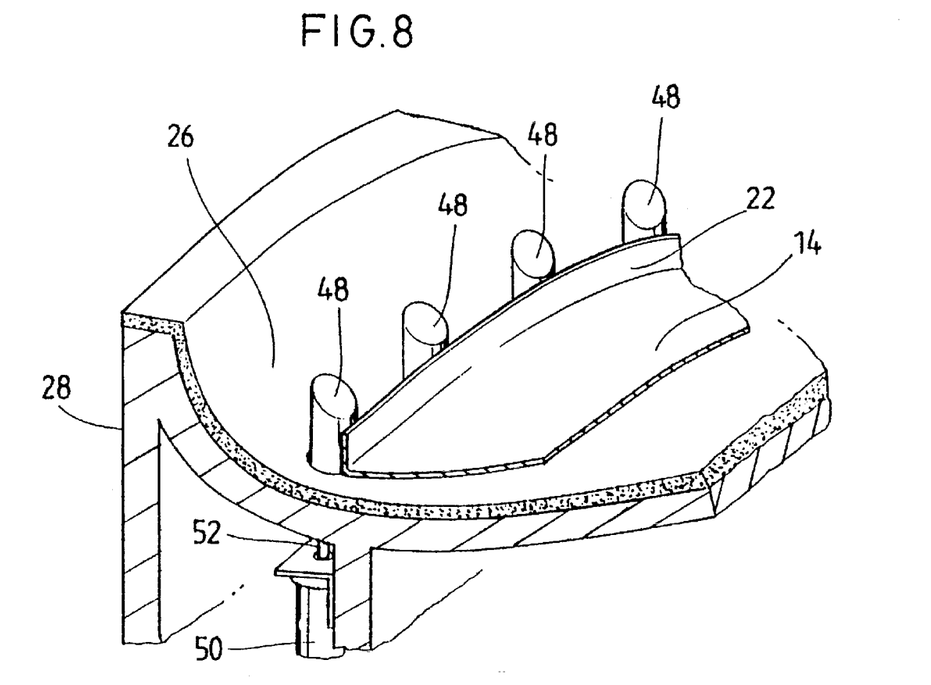
FIG. 8 shows in partially cut-away perspective view the state where supporting members are arranged at predetermined intervals along the line where the edge portion of the surfacing material set on the cavity wall of the lower die lies.

By the way, in practicing the above-described process, as already described referring to FIG. 10, there is a liability to occurrence of defective products due to outward falling of the edge portion 22. Accordingly, as shown in FIGS. 1 and 2, it is recommended to arrange descendable supporting members 48 at strategic positions on the cavity wall 26 of the lower die 28 to retain the edge portion 22 of the surfacing material 14 thereby until the upper die 32 is closed. Namely, as shown in FIG. 8, the supporting members 48 are arranged at predetermined intervals along the line where the edge portion 22 of the surfacing material 14 lies when set on the cavity wall 26 of the lower die 28. As the supporting members 48, for example, cylindrical members disposed at the tips of the piston rods 52 provided in fluid pressure cylinders 50 such as air cylinders can suitably be employed. In the illustrated embodiment, contact sensors 54 are disposed on the tops of the supporting members 48. These contact sensors 54 detect contact of the panel main body 12 with the supporting members 48 when the upper die 32 is being closed and transmit a signal to a controller 56 to actuate the fluid control valves 58 of the cylinders 50 and allow the supporting members 48 to descend automatically. Each supporting member 48 is provided with a suction hole 60, which communicates to a vacuum suction source 62, at the position where it is abutted against the edge portion 22, and thus the edge portion 22 can suitably be retained closely by the supporting members 48 with the aid of the vacuum force. Incidentally, in this case, the communication between the suction hole 60 and the vacuum suction source 62 is interrupted under the detecting action of the contact sensors 54 at the point that the upper die 32 descends to bring the panel main body 12 into contact with the supporting members 48.

Figure 9:
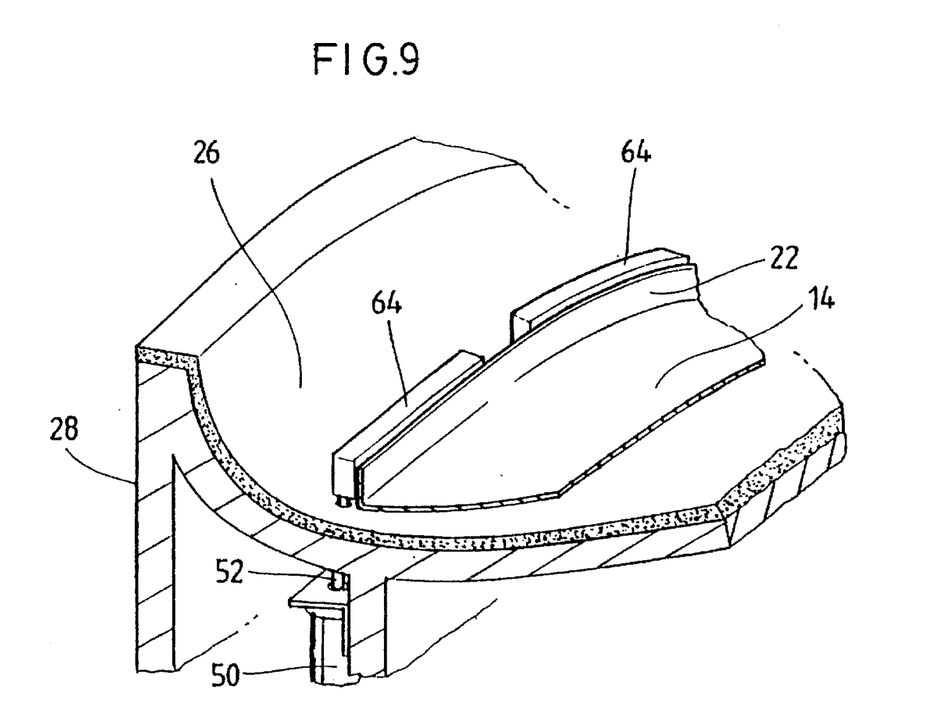
FIG. 9 shows in partially cut-away perspective view the state where belt-like supporting pieces provided along the line where the edge portion of the surfacing material set on the cavity wall of the lower die lies are designed to be supported by supporting members at predetermined intervals.

While the supporting members 48 are designed to be descended under control by the fluid pressure cylinders 50 in the illustrated embodiment, the fluid pressure cylinders 50 may be replaced by fluid dampers employing air or a fluid as the damping source or coil springs which normally urge the supporting members 48 resiliently upward and which also retract concomitantly downward as pressed by the closing upper die 32. (In this constitution, the fluid dampers or springs are uncontrolled.) Referring now to the arrangement pattern of the supporting members 48, belt like supporting pieces 64 may be provided along the line where the edge portion 22 of the surfacing material 14, when set on the cavity wall 26 of the lower die 28, lies, and the supporting pieces 64 may be supported by the piston rods 52 of the fluid pressure cylinder at predetermined intervals, as shown in FIG. 9.

Figure 4:
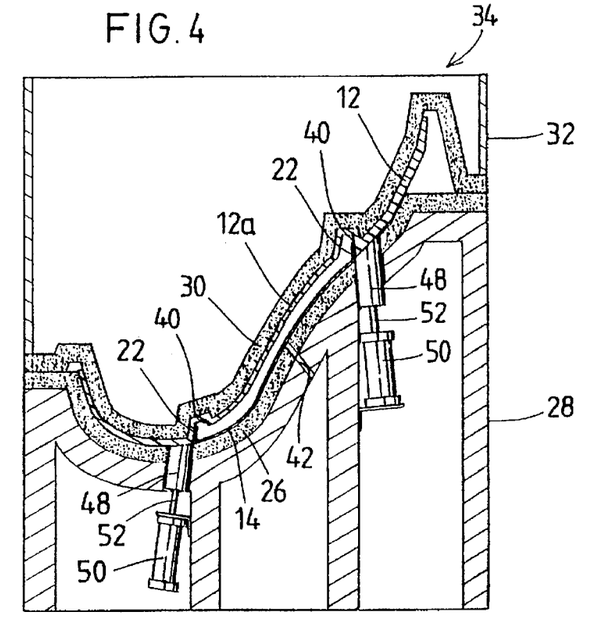
FIG. 4 shows in vertical cross section the state where the die closing is being carried out in the mold shown in FIG. 3.
Figure 5:
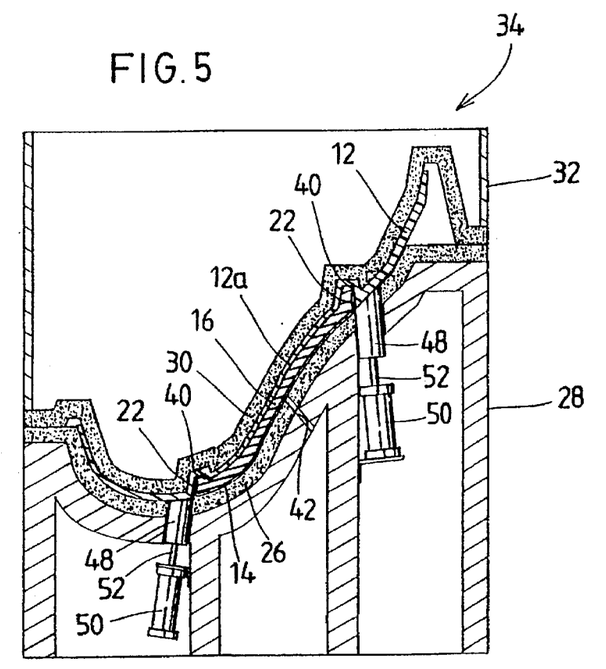
FIG. 5 shows in vertical cross section the state where the die closing is completed and a raw material urethane is being shot into the mold.

When the pad molding mold according to such constitution is used, the supporting members 48 are preliminarily ascended above the cavity wall 26 of the lower die 28, when the surfacing material 14 is to be set thereon, as shown in FIG. 3. Thus, the edge portion 22 can be retained by the supporting members 48, as shown in FIG. 2, so that the edge portion 22 can be prevented from falling outward. Subsequently, when the upper die 32 is closed with respect to the lower die 28, as shown in FIGS. 1 and 4, the panel main body 12 set on the upper die 32 is abutted against the supporting members 48 to descend them. Since the supporting members 48 are retaining the edge portion 22 until they are fully retracted below the cavity wall 28 of the lower die, the edge portion 22 does not fall outward but can smoothly slip into the recess 40 of the panel main body 12. As already described referring to FIG. 5, after passage of a predetermined time from injection of the urethane raw material, a pad 36 consisting of the panel main body 12, the surfacing material and the urethane foam 16 filled in the space defined therebetween can partially be formed on the instrumental panel 10.

It will be apparent to those skilled in the art that the present invention may be embodied in many other specific forms without departing from the spirit or scope of the invention. Therefore, the present embodiment and the variation are to be considered as illustrative and not restrictive and the invention is not to be limited to the details given herein, but may be modified within the scope of the appended claims.

What is claimed is:

1. A mold for partially molding a pad by setting a panel main body and a surfacing material on a core of an upper die and on a cavity wall of a lower die, respectively, and allowing a urethane stock solution to be foamed in the space defined between said panel main body and said surfacing material to mold an instrument panel provided with a pad having a urethane foam as a core material;

the improvement comprising: said core material of said upper die has a groove having a U-shaped cross section in which a recess provided on a front surface of said panel main body can intimately be received; said cavity wall of said lower die is provided with descendible supporting members arranged, when said upper die is closed, at positions slightly outer than said groove formed on said core; and said supporting members when ascended are designed to retain an edge portion standing from a periphery of said surfacing material toward a rear surface thereof, when said surfacing material is set on said cavity wall, and to descend as said upper die is closed; and wherein said supporting members are attached to piston rods of fluid pressure cylinders and are ascended or descended by operating said cylinders under control and sensors are disposed on tops of said supporting members which detect contact of said panel main body with said supporting members as said upper die is being closed to actuate control valves of said fluid pressure cylinders via a controller and allow said supporting members to descend automatically.

* * * * *